US008341606B2

(12) United States Patent
Chung

(10) Patent No.: US 8,341,606 B2
(45) Date of Patent: Dec. 25, 2012

(54) METHOD OF INVOKING INLINED METHOD AND JAVA VIRTUAL MACHINE USING THE METHOD

(75) Inventor: Seung-bum Chung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1338 days.

(21) Appl. No.: 11/652,597

(22) Filed: Jan. 12, 2007

(65) Prior Publication Data

US 2007/0204258 A1 Aug. 30, 2007

(30) Foreign Application Priority Data

Feb. 24, 2006 (KR) ........................ 10-2006-0018412

(51) Int. Cl.
*G06F 9/45* (2006.01)

(52) U.S. Cl. ......................... 717/139; 717/136; 717/148

(58) Field of Classification Search ........................ None
See application file for complete search history.

(56) References Cited

U.S. PATENT DOCUMENTS 6,003,038 A * 12/1999 Chen .................................... 1/1
6,138,210 A * 10/2000 Tremblay et al. ............ 711/132
6,170,083 B1 * 1/2001 Adl-Tabatabai ............. 717/158
6,185,597 B1 2/2001 Paterson et al.
6,658,657 B1 12/2003 Lueh
2002/0144011 A1 10/2002 Hinsley
2002/0144243 A1 * 10/2002 Alexander, III et al. ...... 717/140
2002/0188931 A1 * 12/2002 Ewart et al. .................. 717/154
2004/0088720 A1 * 5/2004 Nistler et al. ................ 719/332

FOREIGN PATENT DOCUMENTS

JP 2005-284729 A 10/2005
KR 10-2005-0074766 A 7/2005

OTHER PUBLICATIONS

Toshia Suganuma, "An Empirical Study of Method Inling for a Java-In-Time Compiler", 2002, IBM Tokyo Research Laboratory, pp. 1-10.*

* cited by examiner

*Primary Examiner* — Li B Zhen
*Assistant Examiner* — Lenin Paulino
(74) *Attorney, Agent, or Firm* — Sughrue Mion, PLLC

(57) ABSTRACT

Provided is a method of invoking an inlined method and a Java virtual machine using the method. The method includes, when a first method is invoked, generating a frame comprising information that is needed for execution of the first method, and, when a second method that satisfies a predetermined condition is invoked, executing the second method using the frame.

21 Claims, 10 Drawing Sheets

METHOD OF INVOKING INLINED METHOD AND JAVA VIRTUAL MACHINE USING THE METHOD

CROSS-REFERENCE TO RELATED APPLICATION

This application claims priority from Korean Patent Application No. 10-2006-0018412 filed on Feb. 24, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to a Java virtual machine, and more particularly, to invoking an inlined method and a Java virtual machine using the inlined method.

2. Description of the Related Art

In order to develop hardware platform-dependent application programs, application programs must be separately designed to be compatible with respective corresponding hardware platform, even though the application programs are to perform the same operations. Accordingly, the demand for the development of hardware platform-independent application programs has gradually increased. As part of efforts to meet this demand, virtual machines that are obtained by abstracting hardware platforms have been developed. An example of such virtual machines are Java virtual machines.

In order to generate a platform-independent execution file using Java, a source code is complied into a bytecode, which is a unique format for Java programs, and enables a Java virtual machine to execute the bytecode.

Conventional Java virtual machines are classified, according to the types of their respective execution engines, into interpreter-type Java virtual machines, just-in-time (JIT) compiler-type Java virtual machines, interpreter-and-JIT compiler-type Java virtual machines, and ahead-of-time (AOT) compiler-type Java virtual machines.

In the case of interpreter-type Java virtual machines, a plurality of bytecodes of a method to be executed are sequentially interpreted by an interpreter, thereby enabling an application program to operate. An interpreter manages information regarding a method currently being executed using a data structure called 'frame'.

If a method to be invoked is sufficiently long and complicated, then there is the need to preserve a frame that is independent from the method by creating a new frame. However, if the method to be invoked is a very simple method (e.g., a method such as a setter function or a getter function that simply reads/writes necessary values by accessing a field in a class), then the creation of a new frame for the purpose of invoking the method to be invoked may be inefficient and time-consuming.

In the meantime, Korean Patent Laid-Open Gazette No. 10-2005-0074766, entitled "System and Method for Improving Processing Speed of Java Program," discloses a technique of improving the performance of an application program by enabling a Java virtual machine to perform the loading of a class file and the compilation of the class file at the same time. However, this technique simply aims to improve the processing speed of a Java program using a complier, and thus may not be able to be applied to Java virtual machines using an interpreter.

SUMMARY OF THE INVENTION

The present invention provides a method and apparatus for improving the method invocation performance of an interpreter of a Java virtual machine.

However, the aspects of the present invention are not restricted to the one set forth herein. The above and other aspects of the present invention will become more apparent to one of daily skill in the art to which the present invention pertains by referencing a detailed description of the present invention given below.

According to an aspect of the present invention, there is provided a method of invoking an inlined method. The method includes, when a first method is invoked, generating a frame having information that is needed for execution of the first method, and, when a second method that satisfies a predetermined condition is invoked, executing the second method using the frame.

According to another aspect of the present invention, there is provided a Java virtual machine. The Java virtual machine includes a class loader which loads a class file comprising a first method and a second method that satisfies a predetermined condition, and an interpreter which generates a frame comprising information that is needed for execution of the first method when the first method is invoked, and executes the second method using the frame when the second method is invoked.

BRIEF DESCRIPTION OF THE DRAWINGS

The above and other features and aspects of the present invention will become more apparent by describing in detail exemplary embodiments thereof with reference to the attached drawings, in which.

DETAILED DESCRIPTION OF THE INVENTION

Figure 1:
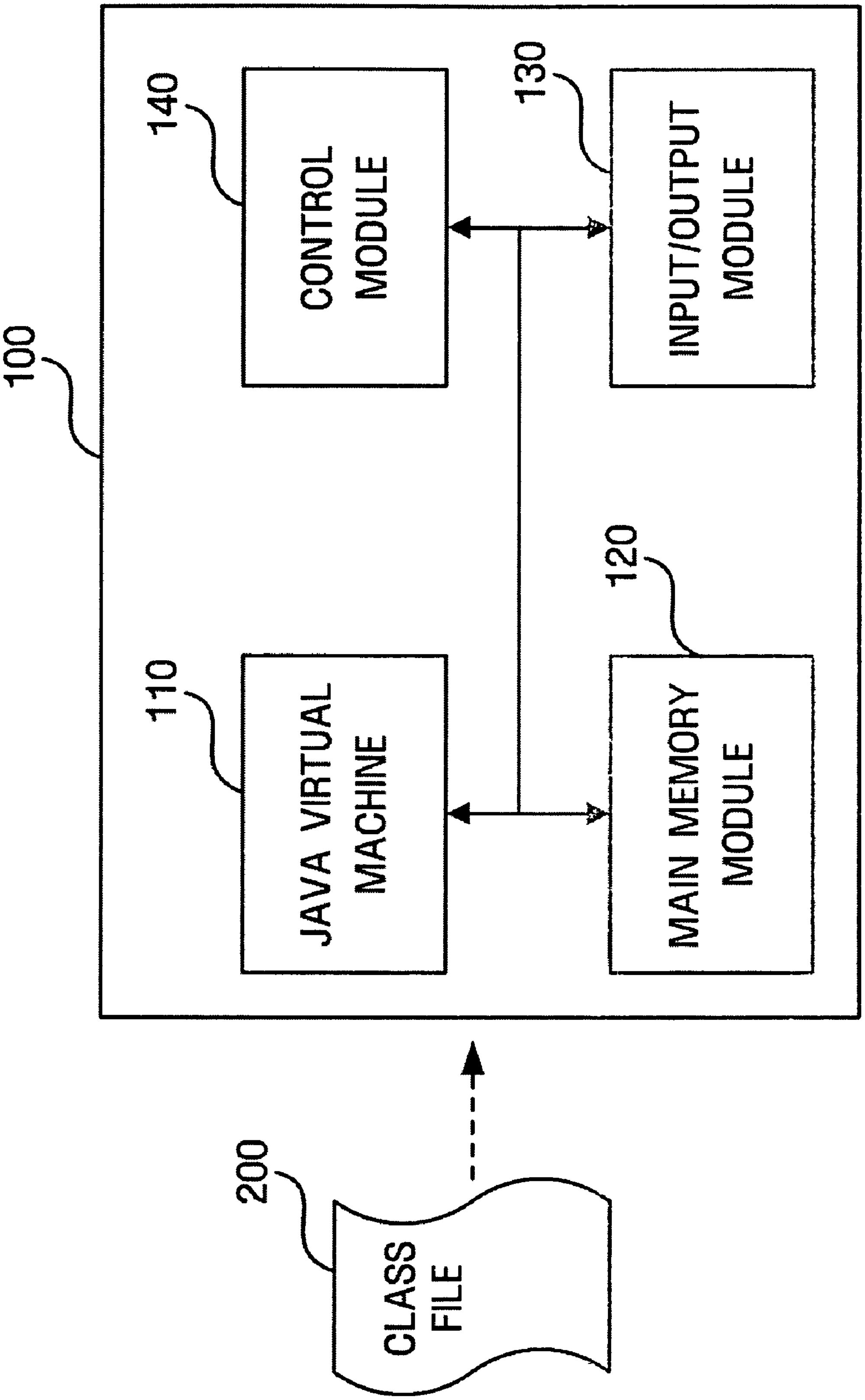
FIG. 1 is a block diagram of a digital processing apparatus equipped with a Java virtual machine according to an exemplary embodiment of the present invention.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus their description will be omitted.

FIG. 1 is a block diagram of a digital processing apparatus 100 equipped with a Java virtual 110 machine according to an exemplary embodiment of the present invention. Referring to FIG. 1, the digital processing apparatus 100 includes the Java virtual machine 110, a main memory module 120, an input/output module 130, and a control module 140.

The Java virtual machine 110 performs predetermined functions that are needed by the digital processing apparatus 100. For example, if the digital processing apparatus 100 is a broadcast receiver, then the Java virtual machine 110 may display received broadcast information. If the digital processing apparatus 100 is an Internet communication apparatus, then the Java virtual machine 110 may drive a web browser or execute an Applet, MIDlet, or Xlet. In addition, the Java virtual machine 110 may execute various types of Java applications.

The Java virtual machine 110 loads a class file 200 to perform its operations. The class file 200 will hereinafter be described in detail with reference to FIG. 2.

Figure 2:
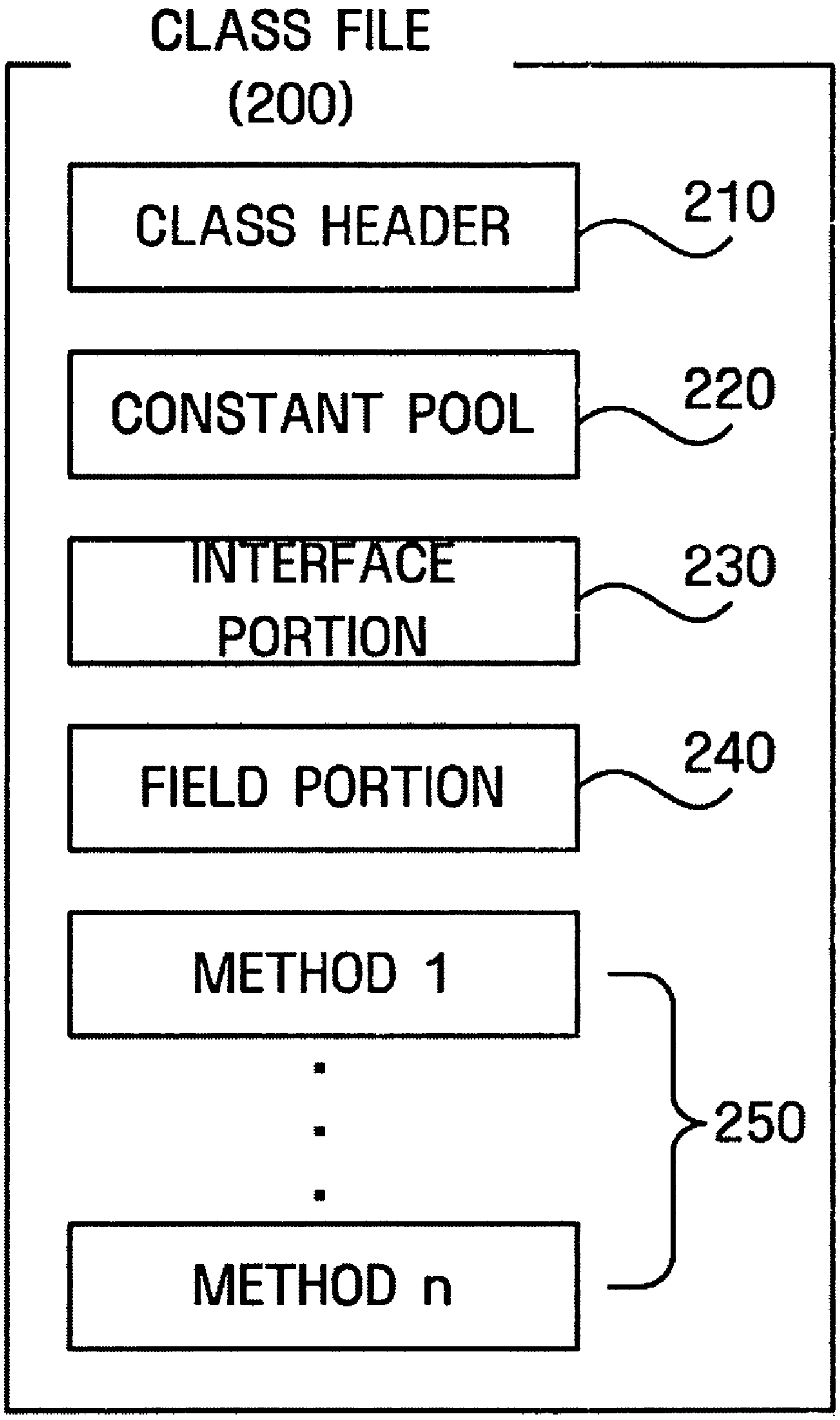
FIG. 2 is a block diagram of a class file according to an exemplary embodiment of the present invention.

Referring to FIG. 2, the class file 200 includes a class header 210 which displays basic attributes of the class file 200, a constant pool 220 which comprises a plurality of constants that are needed to execute a method, an interface portion 230 which includes information regarding an interface of the class file 200, a field portion 240 which includes information regarding a field of the class file 200, and more than one method 250, i.e., methods 1 through n.

The class file 200 may also include information other than those set forth herein.

Referring to FIG. 1, the main memory module 120 provides memory space in which a stack and a buffer that are needed for the operation of the Java virtual machine 110 can be realized. According to the present exemplary embodiment, the main memory module 120 may be realized as a random access memory (RAM) such as a dynamic RAM (DRAM), a static RAM (SRAM), or a synchronous DRAM (SDRAM).

The input/output module 130 provides data that is needed for the operation of the Java virtual machine 110, and receives the result of the operation of the Java virtual machine 110. The class file 200 may be located in various places, for example, a network, an external apparatus, or an auxiliary memory module (not shown) of the digital processing apparatus 100. Therefore, in order to obtain the class file 200, the input/output module 130 may include a network interface, an external apparatus interface, or an auxiliary memory interface. Also, the input/output module 130 may output the result of the operation of the Java virtual machine 110 to a display device or a speaker.

The control module 140 controls the operations of the Java virtual machine 110, the main memory module 120, and the input/output module 130.

Referring to FIG. 1, the digital processing apparatus 100 may be realized as an electronic product having a data storage function and a data processing function such as a mobile phone, a personal digital assistant (PDA), a digital TV, a set-top box, a laptop computer, or a desktop computer. The Java virtual machine 110 will hereinafter be described in further detail.

Figure 3:
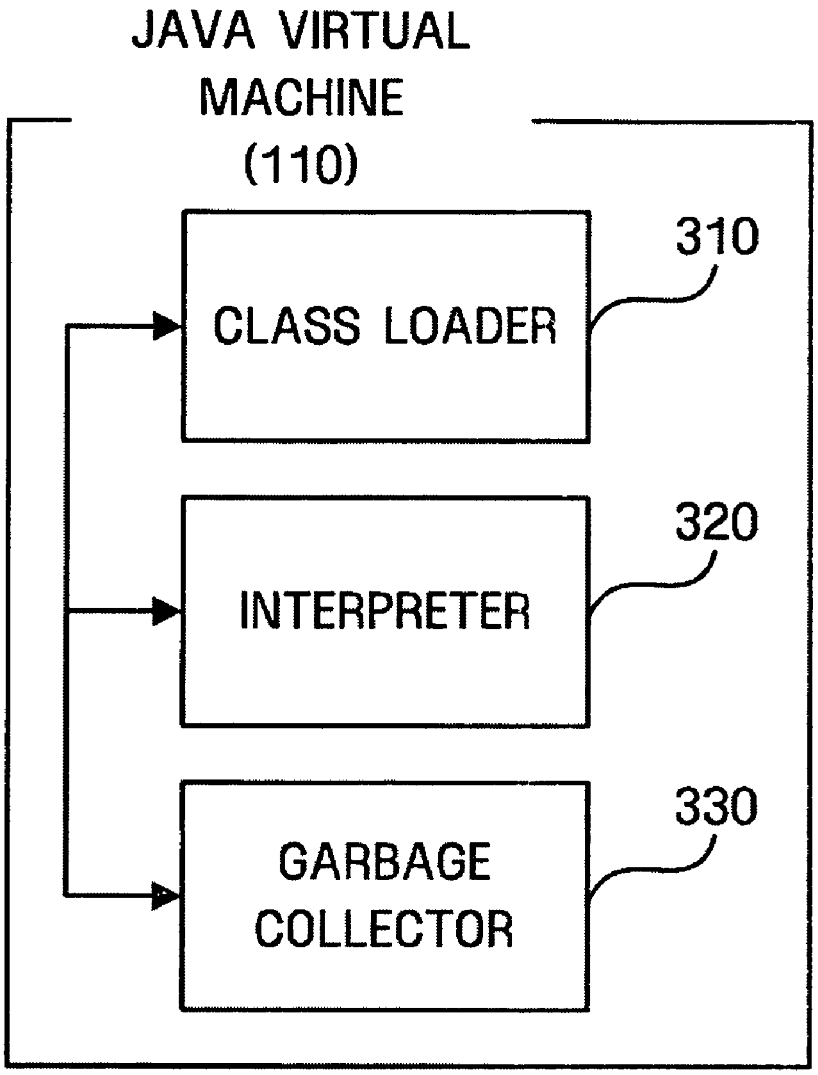
FIG. 3 is a block diagram of the Java virtual machine illustrated in FIG. 1.

FIG. 3 is a block diagram of the Java virtual machine 110 illustrated in FIG. 1. Referring to FIG. 3, the Java virtual machine 110 includes a class loader 310, an interpreter 320, and a garbage collector 330.

The class loader 310 loads the class file 200, and generates a method block for each of the methods 250 included in the class file 200. A method block includes information regarding a method, and FIG. 4 is a block diagram of an example of the method block, i.e., a method block 400 according to an exemplary embodiment of the present invention.

Figure 4:
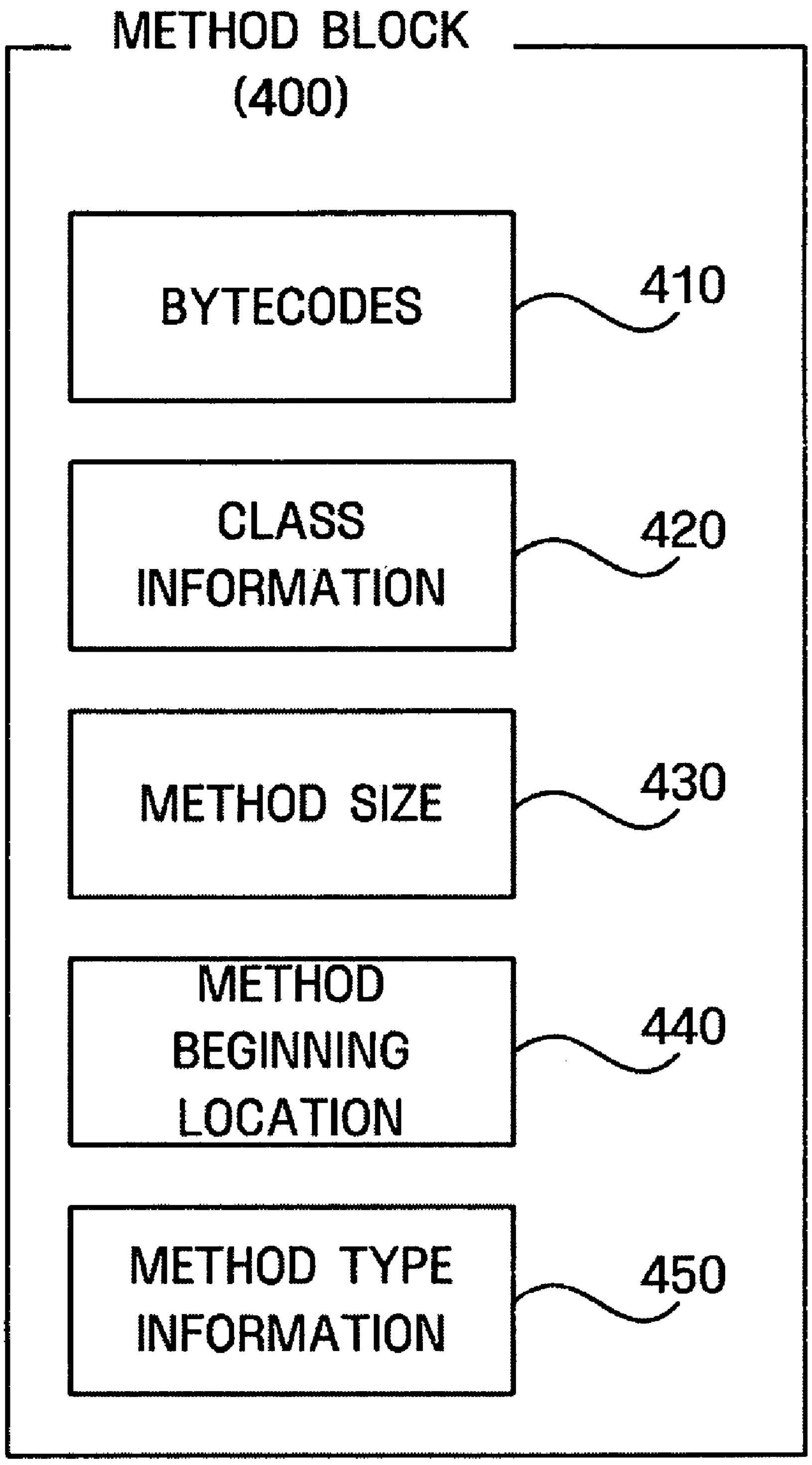
FIG. 4 is a block diagram of a method block according to an exemplary embodiment of the present invention.

Referring to FIG. 4, the method block 400 includes a plurality of bytecodes 410 which constitute a method corresponding to the method block 400, class information 420 indicating a class to which the method belongs, method size information 430, method beginning location information 440, and method type information 450. The method type information 450 indicates whether the method is an ordinary method, a main method, or an inlined method. An ordinary method has its own frame, a main method has a frame to be shared with an inlined method, and an inlined method shares a frame of a main method. In general, a main method is not much different from an ordinary method in terms of structure and operation. However, for convenience of description, a main method is differentiated from an ordinary method in that a main method shares a frame with an inlined method. Also, a main method is different from an ordinary method in that as large an operand stack as needed for the execution of a method is allocated to an ordinary method, while an operand stack that is a predetermined amount larger than needed for the execution of a method is allocated to a main method.

In order to create the method block 400, the class loader 310 needs to perform verification on the class file 200. The class loader 310 can determine whether the format and content of the class file 200 are proper by verifying the class file 200. In particular, the class loader 310 can determine whether the bytecodes of each of the methods 250 included in the class file 200 are valid by verifying the methods 250.

According to the present exemplary embodiment, the class loader 310 may determine whether each of the methods 250 can operate as a main method or an inlined method during the verification of the class file 200. Then, for a method block of a method 250 that is determined to be either a main method or an inlined method, the class loader 310 sets method type information indicating that the corresponding method 250 is either a main method or an inlined method. For a method block of a method 250 that is determined to be neither a main method nor an inlined method, the class loader 310 sets method type information indicating that the corresponding method 250 is an ordinary method. What methods are classified into main methods or inlined methods will become apparent by referencing FIGS. 6 through 9.

Referring to FIG. 3, when the class loader 310 loads the class file 200, the interpreter 320 executes the methods 250 included in the class file 200. In detail, the interpreter 320 recognizes a plurality of bytecodes that constitute a method, and executes a handler corresponding to each of the recognized bytecodes.

The interpreter 320 manages a method currently being executed using a data structure called ‘frame’. In detail, when invoking a method, the interpreter 320 generates a new frame, and manages information that is needed for the execution of the method using the generated frame. However, if a method to be invoked is an inlined method, then the interpreter 320 does not generate a new frame, but executes the method to be invoked using an existing frame of a main method.

Figure 5:
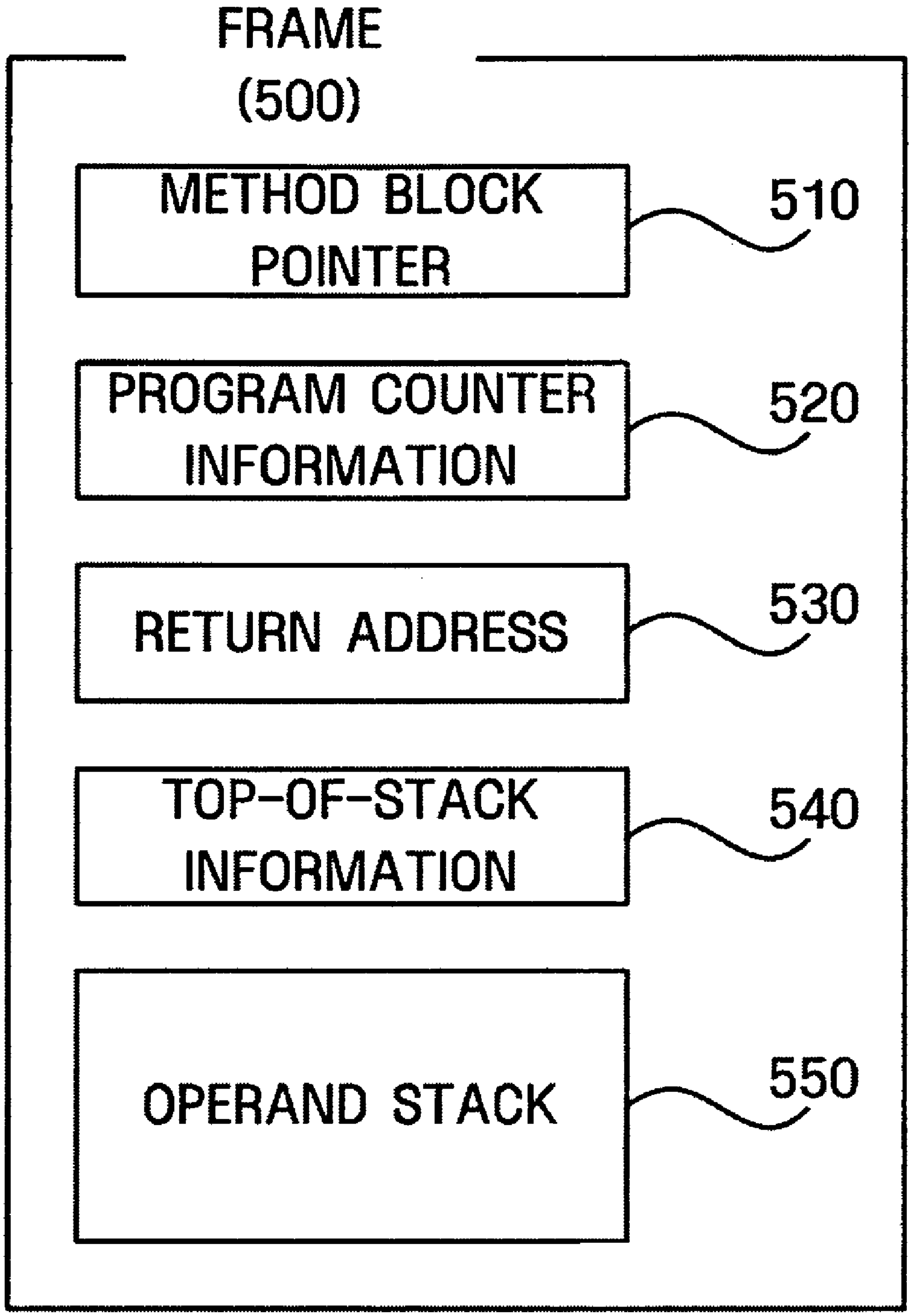
FIG. 5 is a block diagram of a frame according to an exemplary embodiment of the present invention.

FIG. 5 illustrates a frame 500 according to an exemplary embodiment of the present invention. Referring to FIG. 5, the frame 500 includes a method block pointer 510, program counter information 520, a return address 530, top-of-stack information 540, and an operand stack 550.

The method block pointer 510 indicates a method block corresponding to a method (hereinafter referred to as the current method) currently being executed, and the program counter information 520 stores location information of a bytecode currently being executed. The return address 530 indicates the location of a bytecode to be executed after the execution of the current method is complete. The top-of-stack information 540 indicates the top of the operand stack 550 which is used by the interpreter 320. The operand stack 550 is a space where a group of operands that are needed for the execution of the current method are stored.

The program counter information 520 and the top-of-stack information 540 are stored in the frame 500 for preserving a current state regarding the execution of the current method for later use in the situations when there is the need to stop the execution of the current method and perform other operations such as the invocation of a method, the invocation of the garbage collector 330, and Java exception handling. Thus, the program counter information 520 and the top-of-stack information 540 do not need to be stored in the frame 500 whenever a bytecode is executed.

If an invoked method is a main method, then the interpreter 320 may allocate an operand stack that is a predetermined amount larger than needed for the execution of a main method to the invoked method as a memory space, thereby securing as large an operand stack as needed for the execution of an inlined method using a frame of a main method. However, the present invention does not impose any restrictions on how much an operand stack allocated to a main method by the interpreter 320 is a predetermined amount larger than actually needed for the execution of the main method when generating a frame of the main method.

On the other hand, if the invoked method is an inlined method, then the interpreter 320 may use a frame of a main method for the execution of the invoked method so that the frame of the main method is shared with the invoked method. For this, when an inlined method is invoked during the execution of the current method, the interpreter 320 stores location information of a bytecode following a bytecode of the current method that has invoked the inlined method as a return address of a frame, and locates a program counter at a first bytecode of the inlined method. Thereafter, the interpreter 320 uses an operand stack included in a frame of a main method for the execution of the inlined method.

If the invoked method is an ordinary method, then the interpreter 320 may generate a frame and execute the invoked method using the generated frame in the same manner as in the prior art.

Referring to FIG. 3, the garbage collector 330 collects unnecessary memory space for later use, during the execution of a method by the interpreter 320.

The Java virtual machine 110 may also include modules other than set forth herein.

The class loader 310, the interpreter 320, and the garbage collector 330 of the Java virtual machine 110 illustrated in FIG. 3 may be realized as modules. The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 6:
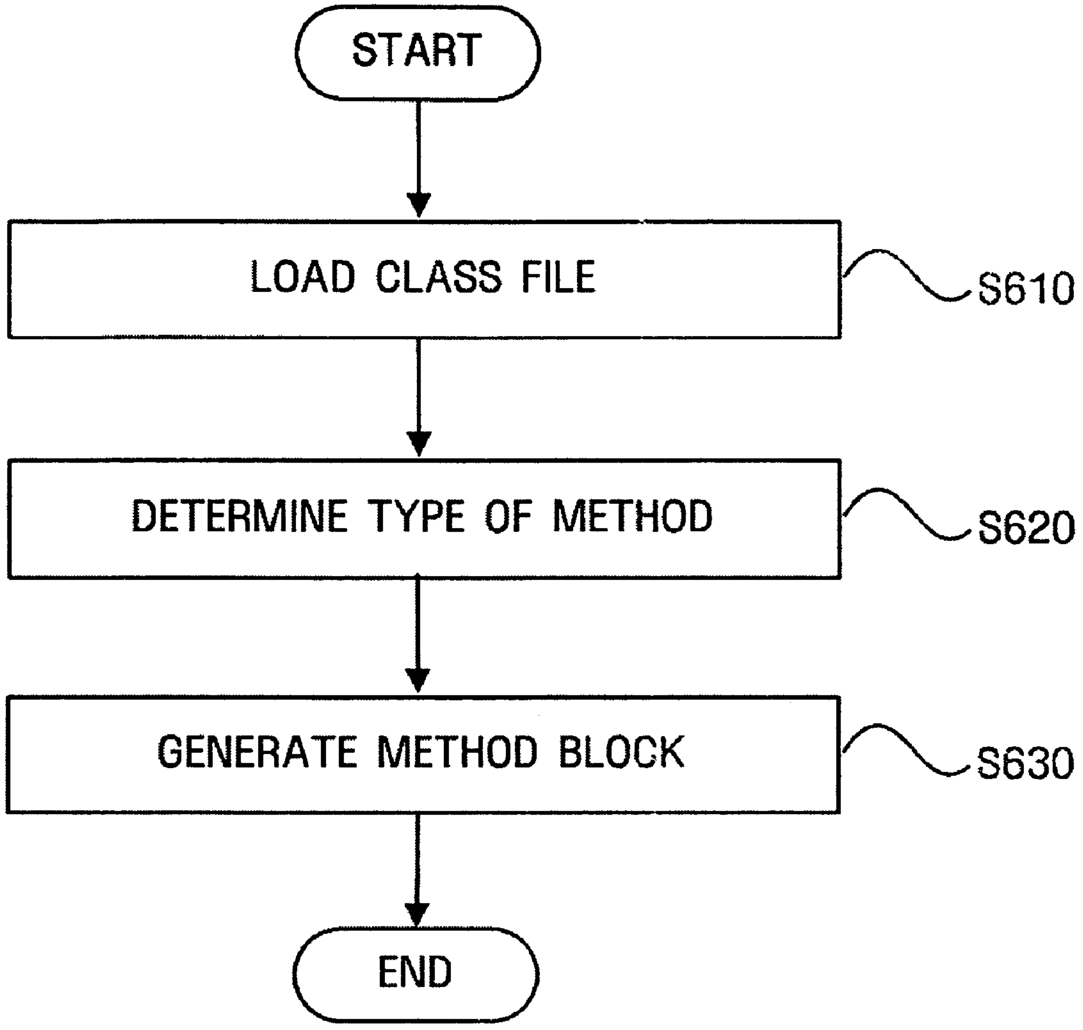
FIG. 6 is a flowchart illustrating a method of providing a method block according to an exemplary embodiment of the present invention.

FIG. 6 is a flowchart illustrating a method of providing a method block according to an exemplary embodiment of the present invention. Referring to FIG. 6, in operation S610, the class loader 310 loads the class file 200 from a network, an external apparatus, or an auxiliary memory module.

In operation S620, the class loader 310 determines the types of the methods 250 included in the class file 200. As a result, each of the methods 250 can be classified into one of an ordinary method, a main method, and an inlined method.

A set of rules used for determining the type of method included in a class file may vary. According to the present exemplary embodiment, a main method may be defined as being a method from which a method invocation path whose level is not higher than a threshold level is derived. The threshold level may be set to an arbitrary value. In addition, according to the present exemplary embodiment, an inlined method may be defined as existing on a method invocation path that is derived from a main method and whose level is not higher than the threshold level.

Figure 7A:
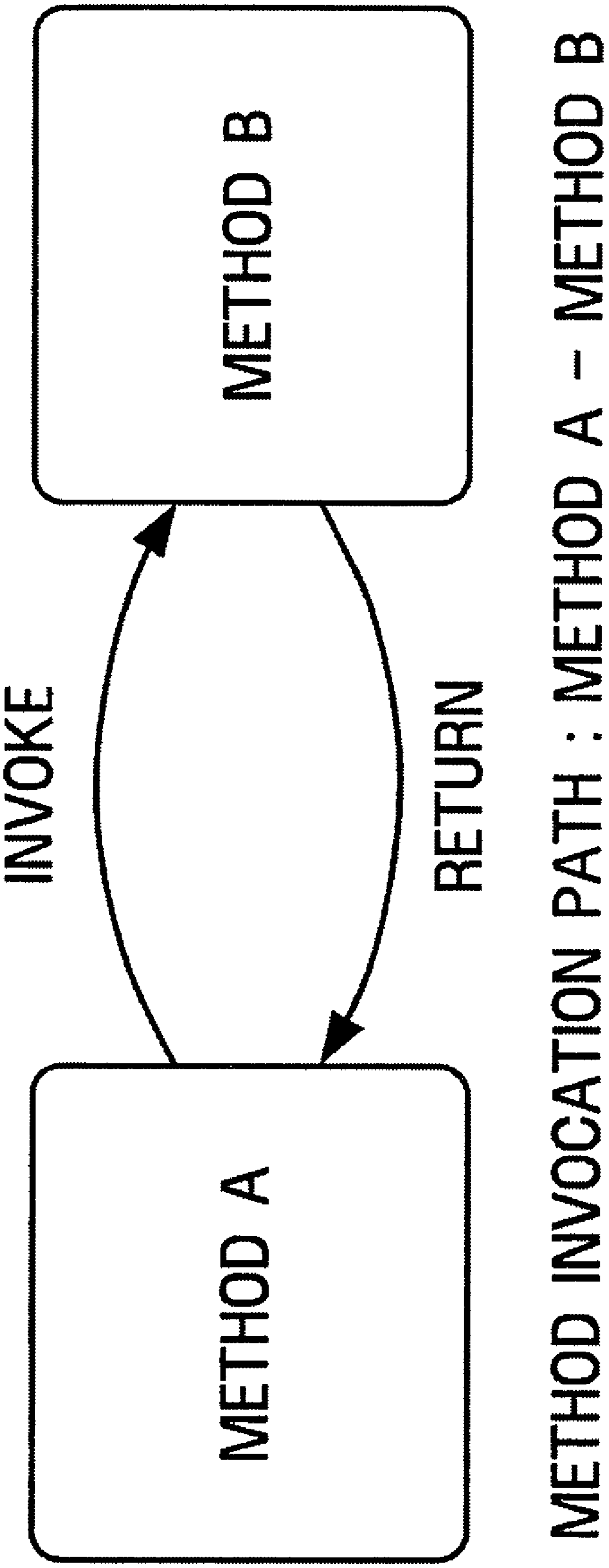
FIGS. 7A and 7B are diagrams for explaining the invocation of a method according to an exemplary embodiment of the present invention.

For example, referring to FIG. 7A, method A invokes method B. Accordingly, method B exists on a method invocation path that is derived from method A. The method invocation path from method A to method B has a level of 1.

Figure 7B:
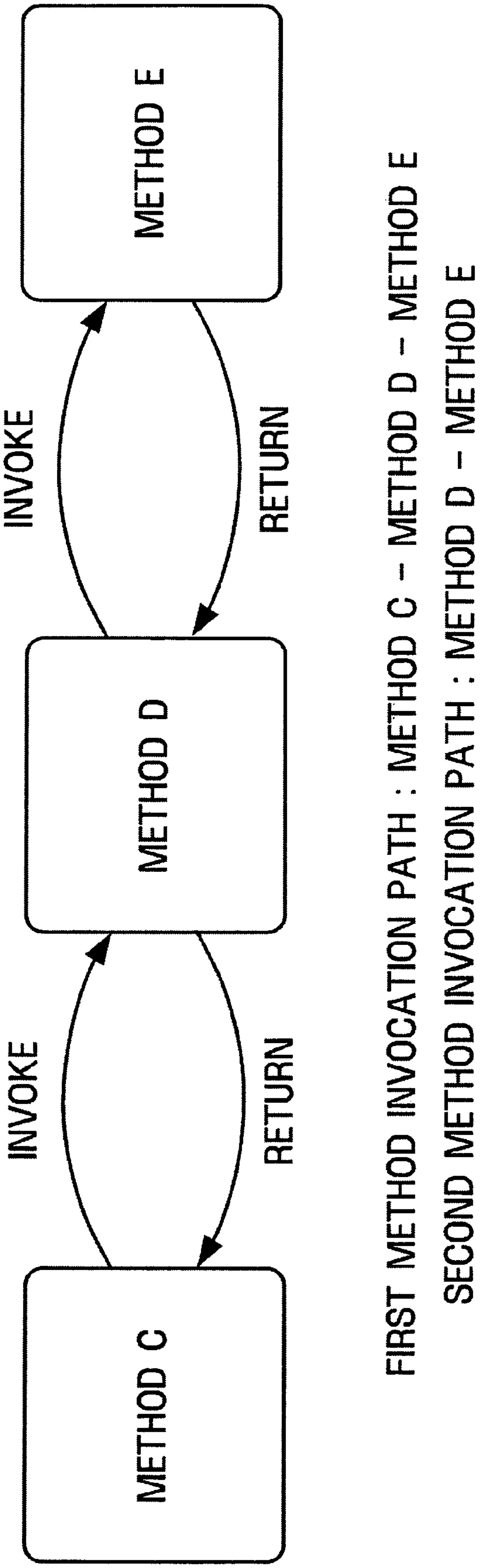

Referring to FIG. 7B, method C invokes method D, and method D invokes method E. Accordingly, methods D and E exist on a first method invocation path that is derived from method C. Since the first method invocation path ranges from method C to method D and from method D to method E, the first method invocation path has a level of 2. Method E also exists on a second method invocation path that is derived from method D. The second method invocation path has a level of 1.

If the threshold level is set to a value of 1, then the level of the first method invocation path is higher than the threshold level, but the level of the second method invocation path is not higher than the threshold level. Thus, method D is determined to be a main method, and method E is determined to be an inlined method associated with method D.

On the other hand, if the threshold level is set to a value of 2, then the levels of the first and second method invocation paths are both not higher than the threshold level, and method D that derives the second method invocation path is invoked by method C. Given all this, the class loader 310 determines whether methods C through E are main methods or inlined methods. In other words, if more than one method invocation path is determined to have a level not higher than the threshold level, then the class loader 310 chooses the method invocation path having the highest level, and determines a method that derives the chosen method invocation path as a main method. Accordingly, if the threshold level is set to a value of 2, then method C may be determined as a main method, and methods D and E are determined as inlined methods associated with method C. From the viewpoint of the second method invocation path, method D may be considered to be a main method for method E. However, method D is already determined as an inlined method associated with method C, and thus cannot be determined as a main method.

Alternatively, it is determined whether a method is a main method or an inlined method according to the size of an operand stack that is needed by the method. In other words, if the size of an operand stack that is needed for the execution of a method is smaller than a threshold size and the method is invoked by another method, then the class loader 310 may set the corresponding method as an inlined method. On the other hand, the class loader 310 may set a method that invokes an inlined method as a main method. In this manner, it is possible to reduce the time and resources consumed to generate a frame when a simple method such as a getter function for reading values or a setter function for modifying values is invoked.

In an exemplary embodiment, the class loader 310 may set a leaf method that does not invoke any method as an inlined method, and set a method that invokes the leaf method as a main method.

Referring to FIG. 6, in operation S630, the class loader 310 generates a plurality of method blocks for the respective methods 250 using the results of the determination performed in operation S620, each method block comprising method type information. The method blocks generated by the class loader 310 may be stored in a memory region provided by the main memory module 120. The structure of the method blocks generated by the class loader 310 has already been described above with reference to FIG. 4.

The class loader 310 may perform operations other than those illustrated in FIG. 6, i.e., verification, preparation, and resolution.

Verification is an operation of determining whether the format and content of the class file 200 are proper. The class loader 310 can determine the method invocation relationships between the methods 250 included in the class file 200 and the sizes of operand stacks that are respectively needed by the methods 250 by performing verification.

Preparation is an operation of determining the default values of constants and variables defined in the class file 200, and resolution is an operation of substituting symbols present in the constant pool 220 with physical location information of resources that are needed for the execution of a class.

Once the aforementioned operations of the class loader 310 are terminated, the class file 200 is initialized, and each of the methods 250 is executed. This will hereinafter be described in detail with reference to FIG. 8.

Figure 8:
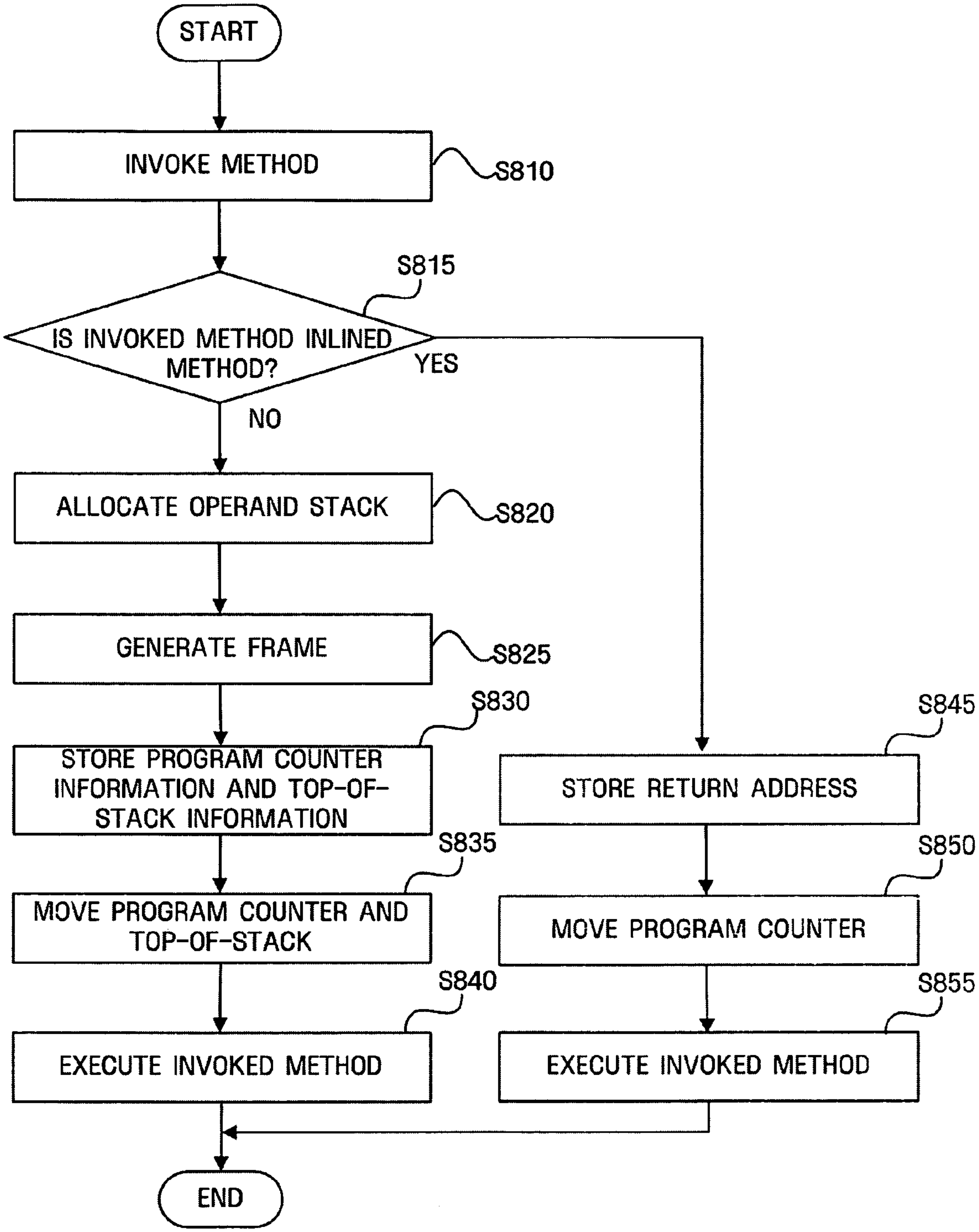
FIG. 8 is a flowchart illustrating a method of invoking a method according to an exemplary embodiment of the present invention.

FIG. 8 is a flowchart illustrating a method of invoking a method according to an embodiment of the present invention. Referring to FIG. 8, assume that there already exists a frame that has been generated for a method (hereinafter referred to as the current method) currently being executed, and the frame will hereinafter be referred to as the existing frame.

In operation S810, a method is invoked. In operation S815, the interpreter 320 determines whether the invoked method is an inlined method by referencing method type information that is included in a method block corresponding to the invoked method.

In operation S820, if it is determined in operation S815 that the invoked method is not an inlined method, then the interpreter 320 allocates an operand stack to the invoked method. In detail, if the invoked method is an ordinary method, the interpreter 320 may allocate as large an operand stack as needed for the execution of the invoked method. However, if the invoked method is a main method, the interpreter 320 may allocate an operand stack that is a predetermined amount larger than actually needed for the execution of the invoked method.

In operation S825, the interpreter 320 generates a frame for the invoked method. In operation S830, the interpreter 320 stores location information of a byte code following a bytecode (hereinafter referred to as the instruction bytecode) of the current method that has given instructions to invoke a new method as program counter information 520 of the frame, and stores top location information of an operand stack allocated to the current method as top-of-stack information 540 of the frame. The program counter information 520 and the top-of-stack information 540 may be used to return to the current method after the execution of the invoked method is complete.

In operation S835, the interpreter 320 locates a program counter at a first bytecode of the invoked method, and locates a top-of-stack at the top of the operand stack allocated to the invoked method. In operation S840, the interpreter 320 executes the invoked method.

In operation S845, if it is determined in operation S815 that the invoked method is an inlined method, then the interpreter 320 stores the location information of the bytecode following the instruction bytecode as a return address 530 of the existing frame. In operation S850, the interpreter 320 locates the program counter at the first bytecode of the invoked method. In operation S850, the interpreter 320 does not move the top-of-stack because an inlined method shares an operand stack of a main method. If a method that has invoked an inlined method, i.e., the current method, is also an inlined method, then the existing frame already includes a return address 530. In this case, the interpreter 320 stores an additional return address 530 in the existing frame so that the additional return address can be differentiated from the existing return address 530. In other words, if more than one inlined method exists for a single main method, the interpreter 320 may store a plurality of return addresses 530 in a frame of the main method.

In operation S855, the interpreter 320 executes the invoked method using an operand stack of the existing frame.

The method illustrated in FIG. 8 is performed when there already exists a frame that has been generated for a method. When a method is executed for the first time and no other method exists, the method is either a main method or an ordinary method. In this case, the method can be executed by performing operations S810 through S840 illustrated in FIG. 8.

Once the execution of the invoked method is complete, the interpreter 320 may resume the execution of the current method in the same manner as in the prior art if the current method is either an ordinary method or a main method. However, if the current method is an inlined method, the interpreter 320 may return to the current method by referencing the return address 530 of the existing frame.

Figure 9:
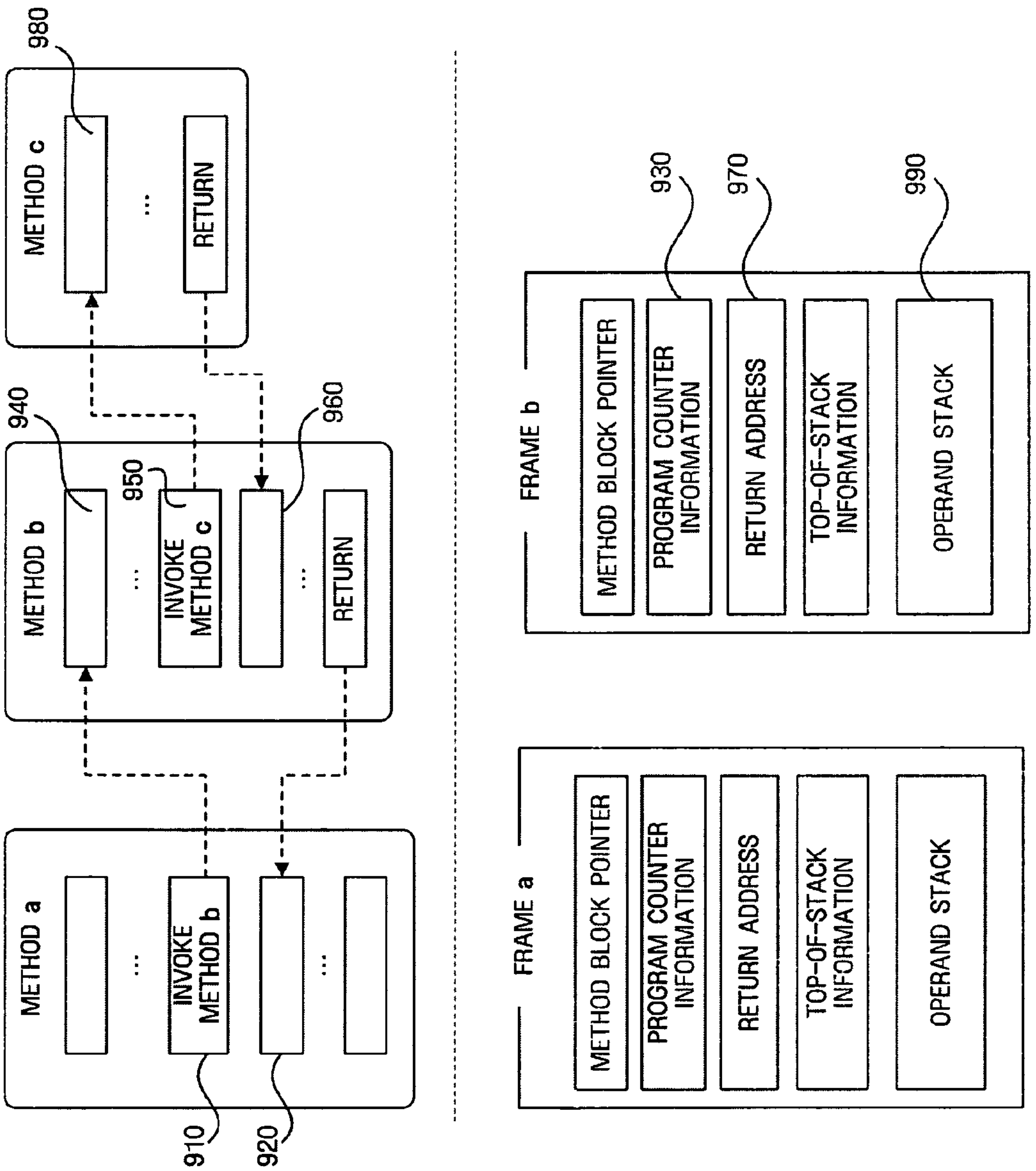
FIG. 9 is a diagram for explaining method invocation and the management of frames according to the results of the method invocation, according to an exemplary embodiment of the present invention.

FIG. 9 is a diagram for explaining method invocation and the management of frames according to the results of the method invocation, according to an embodiment of the present invention. Referring to FIG. 9, method a is an ordinary method, method b is a main method, method c is an inlined method, and reference numerals 910, 920, 940, 950, 960, and 980 indicate bytecodes.

When method a is invoked, the interpreter 320 generates frame a for method a, and executes method a using frame a. Also, when method a is invoked, the interpreter 320 allocates to method a as large an operand stack as needed for the execution of method a.

If method b is invoked by the bytecode 910 of method a during the execution of method a, then the interpreter 320 generates frame b for method b, and executes method b using frame b. Since method b is a main method, the interpreter 320 allocates to method b an operand stack that is a predetermined amount larger than actually needed for the execution of method b.

The interpreter 320 stores location information of the bytecode 920 following the bytecode 910 that has invoked method b in frame b as program counter information 930. Also, the interpreter 320 moves a program counter to the first bytecode 940 of method b, and moves a top-of-stack to the top of the operand stack allocated to method b.

If method c is invoked by the bytecode 950 of method b during the execution of method b, then the interpreter 320 executes method c using frame b. Since method c is an inlined method, the interpreter 320 does not generate a new frame for method c.

When method c is invoked, the interpreter 320 stores location information of the bytecode 960 following the bytecode 950 that has invoked method c in frame b as a return address 970. Also, the interpreter 320 moves the program counter to the first bytecode 980 of method c, and executes method c using an operand stack 990 of frame b.

When the execution of method c is complete, the interpreter 320 moves the program counter to the bytecode corresponding to the return address 970 of frame b, i.e., the bytecode 960, and resumes the execution of method b from the bytecode 960.

When the execution of method b is complete, the interpreter 320 moves the program counter to the bytecode corresponding to the bytecode location information present in the program counter information 930 of frame b, i.e., the bytecode 920, and resumes the execution of method a from the bytecode 920. In this case, frame b may be deleted.

The present invention can be realized by recording a computer program for executing the operation of the Java virtual machine 110 described above with reference to FIGS. 6 through 9 in a recording medium such as a flash memory, a compact disc (CD), or a hard disc, and executing the program from the recording medium with the aid of a computer.

As described above, according to the present invention, it is possible to improve the method invocation performance of a Java virtual machine.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of invoking an inlined method for improving the efficiency of carrying out methods in a computing environment, the method comprising:

if a first method is invoked, generating a first frame comprising information that is used for an execution of the first method; and if a second method that satisfies a predetermined condition is invoked, executing the second method using the first frame and without generating a second frame for the second method;

wherein the first frame comprises a program counter which indicates a location of a bytecode currently being executed, and an operand stack which is to be used by the method currently being executed; and wherein an execution of the second method comprises:

setting the program counter to a location of a first bytecode of the second method without moving a top of the operand stack; and storing location information of a bytecode following a bytecode that has invoked the second method, as a return address;

wherein the second method is an inlined method that is invoked by the first method and does not invoke any method.

2. The method of claim 1, wherein the first frame further comprises the return address which indicates a location of a bytecode to be executed after an execution of a method currently being executed is complete.

3. The method of claim 2, wherein an execution of the second method further comprises:

executing the second method using the operand stack.

4. The method of claim 1, further comprising:

invoking the first method; and allocating an operand stack that is to be used by the first method.

5. The method of claim 4, wherein the operand stack is a predetermined amount larger than an amount used for the execution of the first method.

6. The method of claim 1, wherein the second method exists on a method invocation path that is derived from the first method, wherein the method invocation path has a level not higher than a threshold level.

7. The method of claim 6, wherein a size of an operand stack that is used for an execution of the second method is smaller than a threshold size.

8. The method of claim 1, further comprising:

loading a class file comprising a plurality of methods; and providing information regarding a method of the class file that can serve as the first method and a method of the class file that can serve as the second method.

9. A non-transitory computer-readable recording medium having recorded thereon a computer program for executing the method of any one of claims 1 through 8.

10. The method of claim 1, wherein if a third method that fails to satisfy the predetermined condition is invoked, generating a new frame that is used for executing the third method.

11. A Java virtual machine recorded on a non-transitory computer readable medium, comprising:

a class loader which loads a class file comprising a first method and a second method that satisfies a predetermined condition; and an interpreter which generates a first frame comprising information that is used for execution of the first method if the first method is invoked, and executes the second method using the first frame and without generating a second frame for the second method, if the second method is invoked;

wherein the first frame comprises a program counter which indicates a location of a bytecode currently being executed, and an operand stack which is to be used by the method currently being executed; and wherein an execution of the second method comprises:

setting the program counter to a location of a first bytecode of the second method without moving a top of the operand stack; and storing location information of a bytecode following a bytecode that has invoked the second method, as a return address;

wherein the second method is an inlined method that is invoked by the first method and does not invoke any method.

12. The Java virtual machine of claim 11, wherein the first frame further comprises the return address which indicates a location of a bytecode to be executed after an execution of a method currently being executed is complete.

13. The Java virtual machine of claim 12, wherein the interpreter executes the second method using the operand stack.

14. The Java virtual machine of claim 11, wherein the interpreter invokes the first method, and allocates an operand stack that is to be used by the first method.

15. The Java virtual machine of claim 14, wherein the operand stack is a predetermined amount larger than an amount used for the execution of the first method.

16. The Java virtual machine of claim 11, wherein the second method exists on a method invocation path that is derived from the first method, wherein the method invocation path has a level not higher than a threshold level.

17. The Java virtual machine of claim 16, wherein a size of an operand stack that is used for the execution of the second method is smaller than a threshold size.

18. The Java virtual machine of claim 11, wherein the class loader provides information regarding a method of the class file that can serve as the first method and a method of the class file that can serve as the second method.

19. The Java virtual machine of claim 11, wherein the class loader verifies the first method and the second method as one of an ordinary method, a main method, and an inlined method;

wherein the class loader sets method type information for the first method and the second method based on the verification.

20. A digital processing apparatus comprising:

a Java virtual machine;

a main memory module which provides memory space to be used by the Java virtual machine; and an input/output module which provides the Java virtual machine with predetermined data, and receives results of an operation of the Java virtual machine, wherein the Java virtual machine comprises:

a class loader which loads a class file comprising a first method and a second method that satisfies a predetermined condition; and an interpreter which generates a first frame comprising information that is used for execution of the first method if the first method is invoked, and executes the second method using the first frame and without generating a second frame, if the second method is invoked;

wherein the first frame comprises a program counter which indicates a location of a bytecode currently being executed, and an operand stack which is to be used by the method currently being executed; and wherein an execution of the second method comprises:

setting the program counter to a location of a first bytecode of the second method without moving a top of the operand stack; and storing location information of a bytecode following a bytecode that has invoked the second method, as a return address;

wherein the second method is an inlined method that is invoked by the first method and does not invoke any method.

21. The apparatus of claim 20, wherein the class loader chooses a method invocation path having the highest level satisfying the predetermined condition, and determines a method from chosen method invocation path as the first method.

* * * * *